United States Patent [19]

Ciccone

[11] Patent Number: 5,034,995
[45] Date of Patent: Jul. 23, 1991

[54] HEAD SUPPORTED PORTABLE RADIO ASSEMBLY

[76] Inventor: Michael J. Ciccone, 3519 Bigelow Blvd., Pittsburgh, Pa. 15213

[21] Appl. No.: 572,885

[22] Filed: Aug. 27, 1990

[51] Int. Cl.$^5$ ............................................. A04B 1/08
[52] U.S. Cl. ................................... 455/344; 455/351
[58] Field of Search ............... 455/344, 347, 350, 351;
2/13, 452, DIG. 11; 381/25, 74, 72, 183, 187, 68, 7, 69; D14/192, 224, 205, 252; D16/103–104, 107

[56] References Cited

U.S. PATENT DOCUMENTS

| | | | |
|---|---|---|---|
| 2,611,831 | 9/1952 | Cates | 381/68.7 |
| 2,765,373 | 10/1956 | Smith | 455/344 |
| 3,217,831 | 11/1965 | Scanlon | 381/25 |
| 4,538,034 | 8/1985 | French | 381/187 |
| 4,648,130 | 3/1987 | Kuznetz | 455/351 |
| 4,649,570 | 3/1987 | Terbrack et al. | 455/351 |
| 4,682,363 | 7/1987 | Goldfarb et al. | 455/351 |
| 4,727,599 | 2/1988 | Rappaport et al. | 455/351 |
| 4,856,086 | 8/1989 | McCullough | 455/351 |
| 4,856,089 | 8/1989 | Horton | 455/351 |
| 4,882,769 | 11/1989 | Gallimore et al. | 455/347 |
| 4,901,355 | 2/1990 | Moore | 381/183 |

*Primary Examiner*—Reinhard J. Eisenzopf
*Assistant Examiner*—Lisa Charouel
*Attorney, Agent, or Firm*—William J. Ruano

[57] ABSTRACT

A head supported portable radio assembly that eliminates the inconvenience of having earphone cables extend from the ears to a distantly housed radio or cassette player. It comprises an expandable rubber tubular headband that is worn around the head in combination with a self-contained miniature personal AM/FM stereo radio or mini cassette player. The headband and radio or cassette player can be worn as an attachment to the temples of all types of glasses and sunglasses or it can be worn as a headband that wraps completely around the head therefore does not require attachment to glasses. The tubular headband is designed to keep the wearer's glasses and the attached radio or cassette player from slipping from the head during physical activity. The tubular headband also serves as a conduit for transporting the earphone cables and earphones from the radio or cassette player to the wearer's ears. Earphone cables and jacks extend out of the radio in each direction, through the tube, then exit from each end of the tube where they extend down to the ears. By pulling each end of the tube up along the temple the wearer can quickly adjust the size of the headband and thereby the fit or snugness of the glasses to the head.

1 Claim, 1 Drawing Sheet

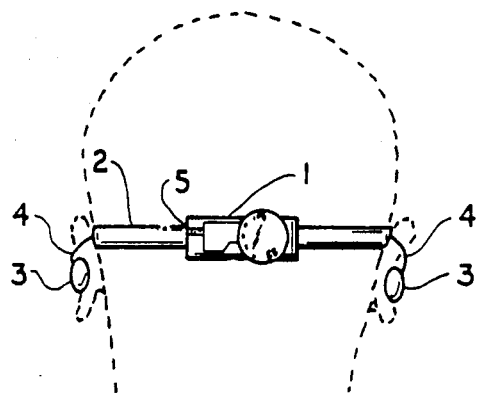
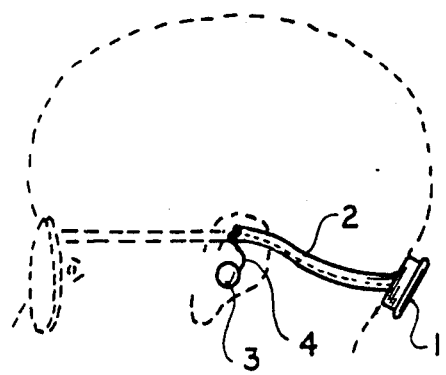
FIG. 1  FIG. 2
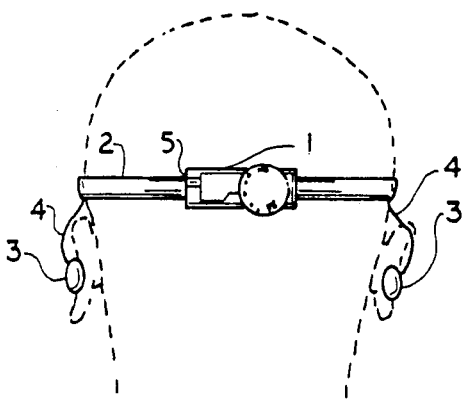
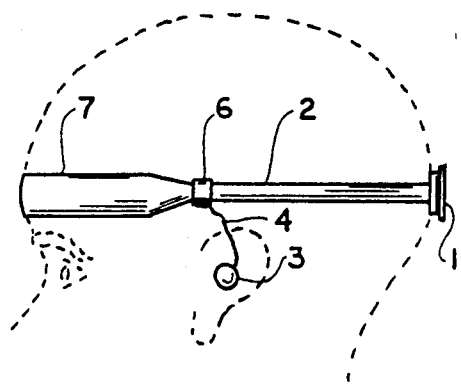
FIG. 3  FIG. 4
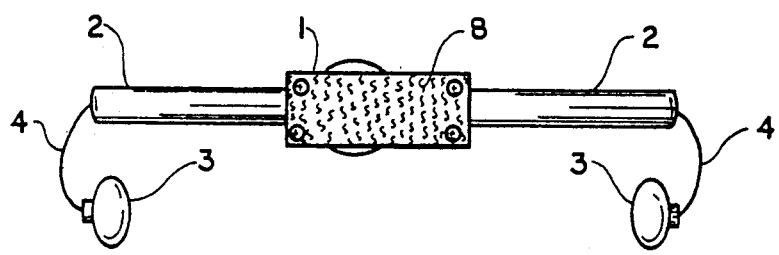
FIG. 5

HEAD SUPPORTED PORTABLE RADIO ASSEMBLY

BACKGROUND OF THE INVENTION

Outdoor enthusiasts and sports fans have an affinity for portable personal radios. However, the more rigorous the activity, the more difficult it is to keep the radio attached to one's person. Portable radios typically locate the power source and tuner some distance from the earphones, requiring the wearer to somehow fasten the tuner and battery pack to their clothing. The weight of the radio and its unsightly cables inconvenience the wearer by restricting movement, often resulting in loss or damage to the unit. Headset radios with antennas are unwieldy, heavy, and resist the body's motion unless adjusted to a state of uncomfortable tension.

SUMMARY OF THE INVENTION

The invention comprises an extensible rubber tubular headband worn around the rear of the head for supporting a miniature radio or mini cassette player. The headband serves as a conduit for the earphone cable. The ends of the temples of eyeglasses or sunglasses tightly fit inside the front open portion of the headband. If eyeglasses are not worn, a headband is worn on the front of the head having ends attached to the ends of the rubber tubing worn behind the head.

BRIEF DESCRIPTION OF THE DRAWINGS

FIG. 1 is a rear view; and

FIG. 2 is a side view of the invention when the wearer has glasses.

FIG. 3 is a rear view.

FIG. 4 is a side view when no glasses are worn.

FIG. 5 is a front view as viewed from the head of the wearer.

DESCRIPTION OF THE PREFERRED EMBODIMENTS

The present invention comprises a radio 1, headband 2 and earphones 3. The headband 2 contains the radio 1 and power supply and earphone cables 4.

Referring to the embodiment shown in FIGS. 1 and 2, the headband 2 acts as a harness for the wearer's sunglasses or spectacles shown in dotted outline. In use, it functions as a system. A mini-fm stereo radio 1 is attached to the outside middle of the strap 2, firmly held to the back of the wearer's head, if the headband 2 is of rubber tubing as a result of the tension caused by the headband tube. Speaker cables 4, encased within the headband, emerge through front openings in the tube along with the headphones 3 that are attached at the ends of the speaker cables. The headband tube is placed over the ends of the temples of the glasses.

A miniature FM stereo radio decoder 1, complete with power and volume switches and easily accessible battery case, if fastened to the headband tube by, means of a nyeon-laminated neoprene band 8 that wraps around the tube and is fixed to the rear side of the radio. The earphones 3 protrude from both ends of the tube. The ends of the glasses temples are firmly attached into the tube's ends. This connects the headband and radio to the glasses while allowing the earphones to be easily inserted downward into the wearer's ears. The glasses can be worn with or without the radio function, and will stay in place with no discomfort during any physical activity. When from the neck, safe from loss and ready to use at a moment's notice.

FIGS. 3 and 4 show a modification used when glasses are not worn. A front headband 7 is attached to tube 2 by means of a pair of clips 6, 6.

FIG. 5 shows the assembly of FIGS. 1 and 2 and shows a retaining band 6 through which tube 2 extends, which retaining band contacts the rear of the wearer's head and may be made of nylon-laminated neoprene.

While I have illustrated and described several embodiments of my invention, it will be understood that these are by way of illustration only and that various changes and modifications are contemplated in my invention within the scope of the following claims:

I claim:

1. A portable, battery powered, miniature radio, a tubing of extensible rubber supporting said radio centrally and externally thereof, a pair of earphones, a pair of wires connecting said radio to said earphones, said pair of wires extending inside and throughout the length of said tubing and emerging from opposite open ends of said tubing, and spectacles having temples with ends which penetrate, by a snug fit, said open ends of said tubing.

* * * * *